(12) United States Patent
Li et al.

(10) Patent No.: US 8,476,584 B2
(45) Date of Patent: Jul. 2, 2013

(54) METHODS FOR SOURCELESS DENSITY DOWNHOLE MEASUREMENT USING PULSED NEUTRON GENERATOR

(75) Inventors: Fusheng Li, Houston, TX (US); Xiaogang Han, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 4 days.

(21) Appl. No.: 13/222,152

(22) Filed: Aug. 31, 2011

(65) Prior Publication Data

US 2013/0048849 A1  Feb. 28, 2013

(51) Int. Cl.
*G01V 5/10* (2006.01)

(52) U.S. Cl.
USPC ..................................... 250/269.8

(58) Field of Classification Search
USPC .......................................... 250/269.1–269.8
See application file for complete search history.

(56) References Cited

U.S. PATENT DOCUMENTS

| | | | | |
|---|---|---|---|---|
| 3,828,189 | A * | 8/1974 | Givens .......................... | 376/164 |
| 3,849,646 | A * | 11/1974 | McKinlay et al. ............. | 376/163 |
| 4,020,342 | A | 4/1977 | Smith, Jr. et al. | |
| 7,148,471 | B2 * | 12/2006 | Roscoe et al. ............. | 250/269.2 |
| 7,491,929 | B2 | 2/2009 | Truax | |
| 7,718,956 | B2 | 5/2010 | Ferguson | |
| 2006/0243898 | A1 * | 11/2006 | Gilchrist ..................... | 250/269.7 |
| 2010/0228483 | A1 | 9/2010 | Lecompte | |
| 2010/0252724 | A1 | 10/2010 | Inanc et al. | |
| 2010/0314535 | A1 | 12/2010 | Zhang et al. | |
| 2011/0024613 | A1 | 2/2011 | Roberts | |
| 2011/0049345 | A1 | 3/2011 | Roberts | |

FOREIGN PATENT DOCUMENTS

EP 0444984 A1 9/1991

OTHER PUBLICATIONS

Yu et al., "Accuracy and borehole influences in pulsed neutron gamma density logging while drilling," 2011, Applied Radiation and Isotopes, vol. 69, pp. 1313-1317.*
Pemper, R., et al. "A New Pulse Neutron Sonde for Derivation of Formation Lithology and Mineralogy". Paper SPE 102770, SPE Annual Technical Conference and Exhibition, San Antonio, Texas. Sep. 24-27, 2006. pp. 1-13.
Xiaogang Han, et al. "Environmental Corrections and System Calibration for a New Pulsed-Neutron Mineralogy Instrument", SPWLA 50th Annual Logging Symposium, Jun. 21-24, 2009. pp. 1-16.
Notification of Transmittal of the International Search Report and the Written Opinion of the International Searching Authority, or the Declaration; PCT/US2012/048242; Jan. 17, 2013.

* cited by examiner

*Primary Examiner* — Kiho Kim
(74) *Attorney, Agent, or Firm* — Cantor Colburn LLP

(57) ABSTRACT

Disclosed is a method for estimating a density of an earth formation penetrated by a borehole. The method includes: emitting a pulse of fast neutrons into the formation during a neutron-pulse time interval; detecting gamma-rays due to inelastic scattering and thermal capture of the emitted neutrons in the formation to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval; determining a macroscopic capture cross section of the formation from a decay in the time spectrum of counts or count rates; determining an elemental weight fraction from the gamma-ray energy spectrum; and estimating the density of the formation using the macroscopic capture cross section and the elemental weight fraction.

6 Claims, 8 Drawing Sheets

METHODS FOR SOURCELESS DENSITY DOWNHOLE MEASUREMENT USING PULSED NEUTRON GENERATOR

BACKGROUND

Geologic formations are used for many purposes such as hydrocarbon production, geothermal production, and carbon dioxide sequestration. Knowing the density of a formation as a function of depth is very important because this information can be used to determine the lithology or rock type and porosity of the rocks making up the formation.

Typically, formation density is measured with a logging tool that is conveyed in a borehole penetrating the formation. The tool includes a gamma-ray source, which is normally Cs-137 emitting 0.662 MeV gamma-rays, and two collimated gamma-ray detectors at different distances from the source. The detectors are used to measure gamma-rays produced mostly by Compton scattering interactions between the source gamma-rays and the formation elements and provide data to determine the formation density. This type of logging tool requires a very high-intensity chemical source emitting 2-3 Curies of radiation. Unfortunately, there are several types of challenges associated with handling and using this type of chemical source. Hence, it would be well received in the drilling and exploration industry if density logging could be made without these types of challenges.

BRIEF SUMMARY

Disclosed is a method for estimating a density of an earth formation penetrated by a borehole. The method includes: conveying a carrier through the borehole; emitting a pulse of fast neutrons into the formation during a neutron-pulse time interval using a pulsed-neutron source disposed at the carrier; detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval; determining a macroscopic capture cross section $\Sigma_F$ of the formation from a decay in the time spectrum of counts or count rates; determining a weight fraction for one or more elements in the formation from the gamma-ray energy spectrum; and estimating the density of the formation using the macroscopic capture cross section and the weight fraction for the one or more elements.

Also disclosed is an apparatus for estimating a density of an earth formation penetrated by a borehole. The apparatus includes: a carrier configured to be conveyed through the borehole; a pulsed-neutron source disposed at the carrier and configured to emit a pulse of neutrons into the formation in a neutron-pulse time interval; a gamma-ray detector configured to detect gamma-rays due to inelastic scattering and thermal capture of the emitted neutrons in the formation; and a processor coupled to the pulsed-neutron source and the gamma-ray detector and configured to implement a method. The method includes: emitting a pulse of fast neutrons into the formation during the neutron-pulse time interval using the pulsed-neutron source; detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval; determining a macroscopic capture cross section $\Sigma_F$ of the formation from a decay in the time spectrum of counts or count rates; determining a weight fraction for one or more elements in the formation from the gamma-ray energy spectrum; and estimating the density of the formation using the macroscopic capture cross section and the weight fraction for the one or more elements.

Further disclosed is a non-transitory computer-readable medium having computer-executable instructions for estimating a density of an earth formation penetrated by a borehole by implementing a method. The method includes: emitting a pulse of fast neutrons into the formation during a neutron-pulse time interval using a pulsed-neutron source disposed in the borehole; detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval; determining a macroscopic capture cross section $\Sigma_F$ of the formation from a decay in the time spectrum of counts or count rates; determining a weight fraction for one or more elements in the formation from the gamma-ray energy spectrum; and estimating the density of the formation using the macroscopic capture cross section and the weight fraction for the one or more elements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
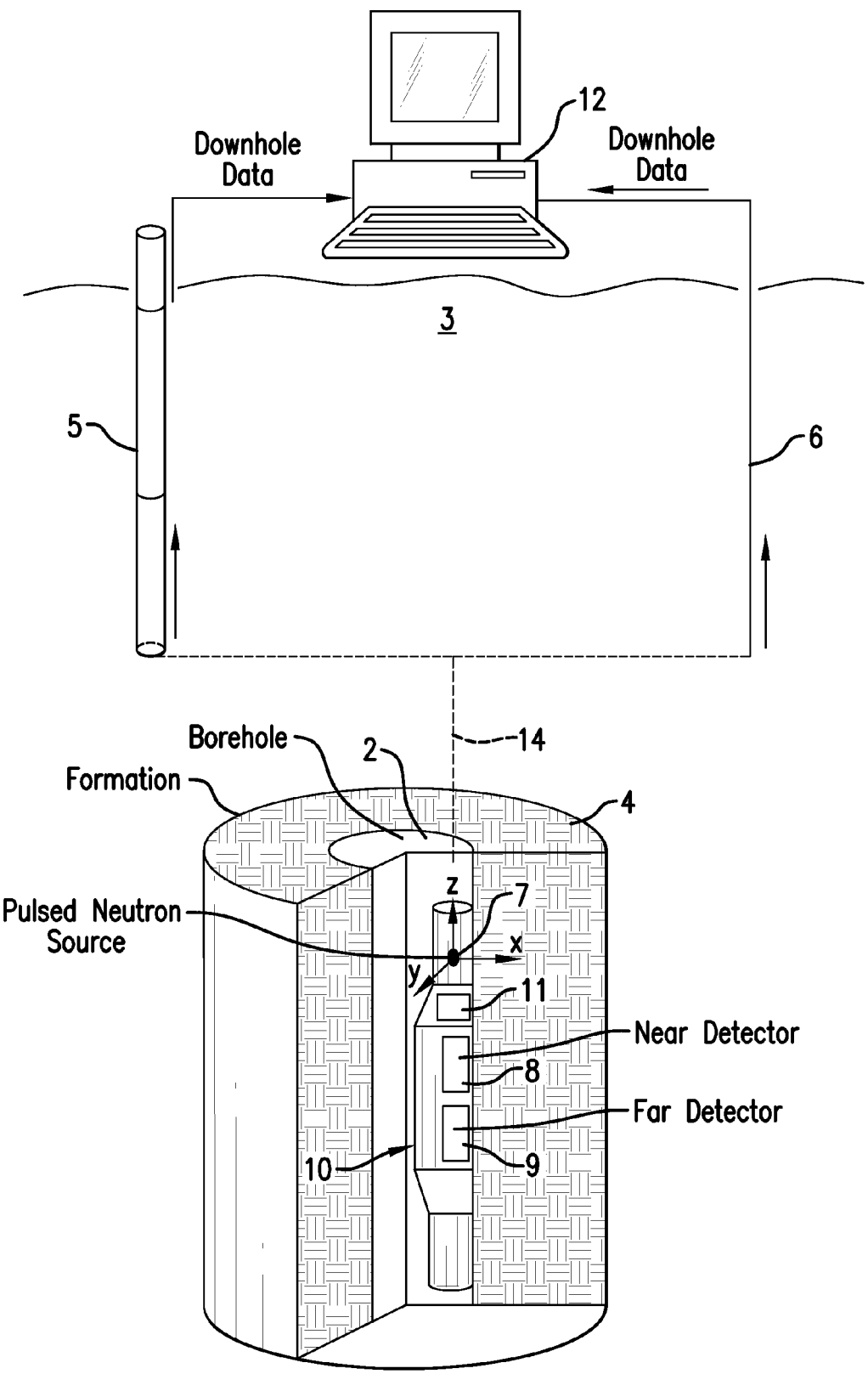
FIG. 1 illustrates an exemplary embodiment of a density logging tool disposed in a borehole penetrating the earth.

FIG. 1 illustrates an exemplary embodiment of a density logging tool 10 disposed in a borehole 2 penetrating the earth 3, which includes an earth formation 4. The density tool 10 is conveyed through the borehole 2 by a carrier 14. The carrier 14 can be a drill string 5 for logging-while-drilling (LWD) applications or a wireline 6 for wireline logging applications. The density tool 10 includes a pulsed-neutron source 7 configured to emit a controlled pulse of fast neutrons (14 MeV) through the borehole 2 and into the formation 4. In order to detect (i.e., measure) gamma-rays resulting from interactions of the emitted neutrons with formation elements, the density tool 10 includes a first detector 8 (i.e., near detector) spaced a first distance from the neutron source 7 and a second detector 9 (i.e., far detector) spaced a second distance from the neutron source 7 where the second distance is greater than the first distance. Because the near detector is closer to the pulsed neutron source than the far detector, the near detector will detect a greater amount of gamma-rays from interactions with borehole materials than the far detector. Thus, output from the near detector can be used to correct output from the far detector for borehole material contributions to the gamma-rays detected by the far detector. Data from operating the neutron source 7 and detecting gamma-rays with the detectors 8 and 9 are used as input to a method or algorithm to determine the density of the formation 4.

Each of the detectors 8 and 9 registers a count when a gamma-ray is detected. Counts are generally associated with a small time window or count window $\Delta t$ in which the counts are summed. The count window is generally small with respect to the width of duration of the neutron pulse, such as 10% or less in one or more embodiments. Dividing the total number of counts summed in a count window by the length of time of the window provides the count rate. Hence, at a certain time t for example, the total number of counts C(t) at time t is the total number of counts in the count window that represents time t. Similarly, the count rate at time t is $C(t)/\Delta t$. Alternatively, if a count rate is specified for a count window, then the total number of counts C(t) is obtained by multiplying the count rate by $\Delta t$.

Still referring to FIG. 1, the density tool 10 includes downhole electronics 11 for operating the tool 10, processing or recording logging data, or communicating with a computer processing system 12 disposed at the surface of the earth. Operating or data processing functions may be performed the downhole electronics 11, the surface computer processing system 12 or by both. In wireline logging, telemetry can be performed using the wireline 6 as a communications medium. In LWD, telemetry can be performed using high-speed telemetry, such as wired drill pipe, or pulsed mud. Using high-speed telemetry has the advantage of determining the formation density in real time.

Figure 2:
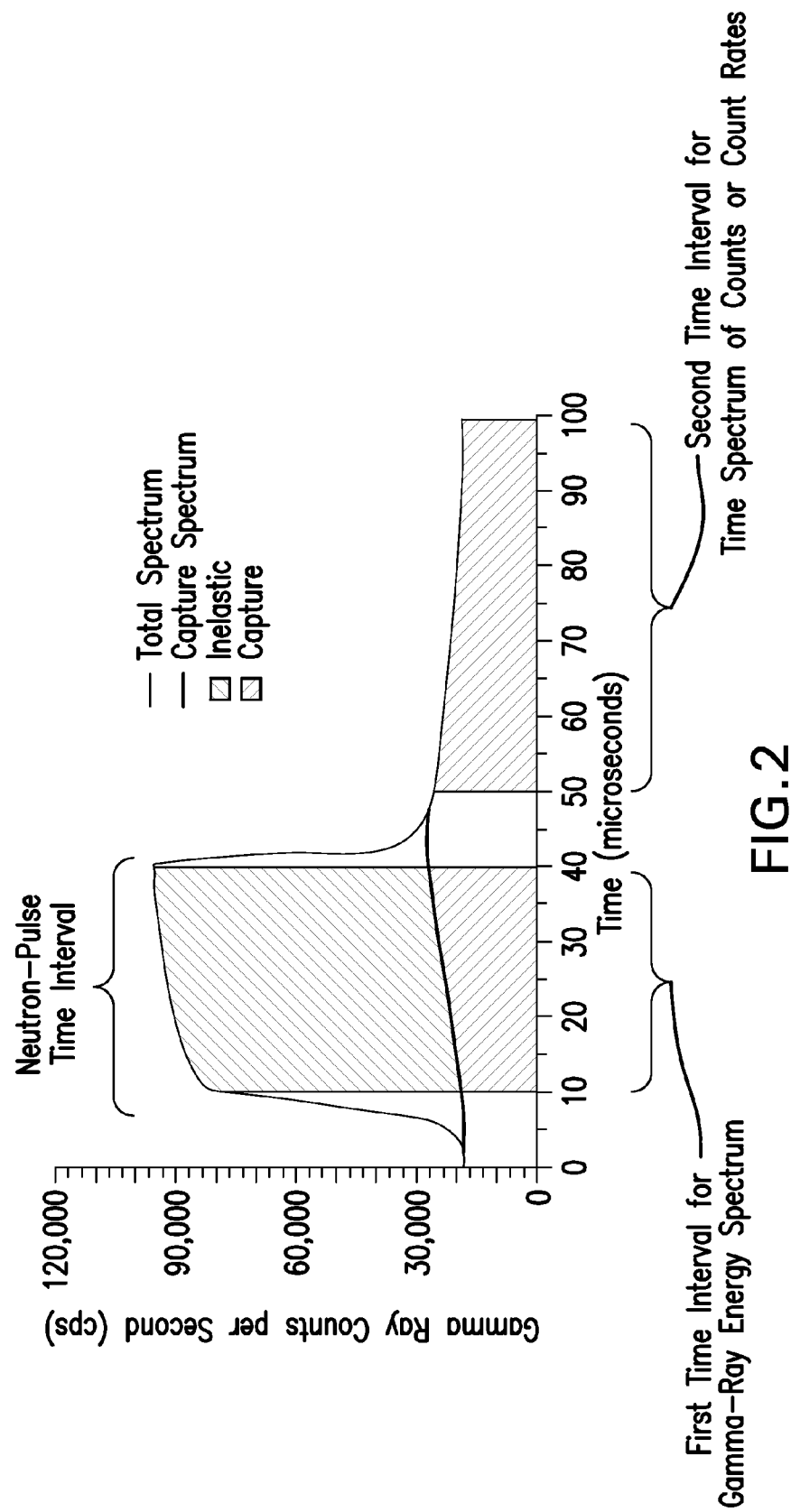
FIG. 2 depicts aspects of a neutron source timing cycle.

In one or more embodiments, the pulsed-neutron source 7 uses a self-replenishing deuterium-tritium (D-T) gas mixture to emit 14 MeV fast neutrons. The pulsed-neutron source 7 includes a rugged compact sealed-tube for housing the gas mixture and components for emitting neutrons from a D-T fusion reaction. The sealed-tube is connected via a cable harness to a power and control electronics module. A computer processor provides automated operation with input of the desired neutron output, pulse width (i.e., length of time of neutron pulse) and pulse frequency. High-yield neutron particles are generated using a pre-set pulse frequency scheme (1 kHz, 2 kHz or 10 kHz etc.). An example of a timing cycle of a neutron pulse is given as in FIG. 2.

In one or more embodiments, the detectors 8 and 9 are scintillation detectors using a scintillation crystal made of LaBr3:Ce. This crystal has a high density (5.08 g/cc) to capture more gamma-rays and provide greater energy resolution for weight fraction determination than other types of scintillation crystals although other types may also be used.

A pulse of neutron particles emitted by the pulsed-neutron source 7 penetrates the borehole 2 and reaches the earth formation 4 where they interact with the rock elements in many ways. Among them, both inelastic scattering of fast neutrons and capture of thermal neutrons produce prompt gamma-rays characteristic to each individual element in the interactions. The elemental weight fraction (compositional concentration) of each element in subsurface rock can be obtained by regressing elemental library energy spectra with the field measured energy spectra from both inelastic and capture events. The time spectrum for capture gamma-rays can also be obtained by calculating the total counts in the energy spectrum or the counts in a specified energy range at each time step. The decay constant of the time spectrum can be interpreted as the macroscopic thermal neutron absorption cross section (sigma, $\Sigma$). After obtaining both the elemental composition and sigma for the same formation, the density of the formation rock can be readily determined from an equation.

The sigma parameter ($\Sigma$) measures the probability of thermal neutrons being absorbed by the surrounding minerals. Each element in the formation 4 has a unique sigma that is a function of its microscopic capture cross section (barn), atomic density (atoms/cm$^3$), and other inherent properties. Formation rocks are considered as assemblages of elements with a fixed chemical formula. Subsurface formations are often comprised of mineral matrix components and some amount of pore spaces, which can be fluid-filled with several fluids such as oil, water, and/or gas. The sigmas of fresh water and oil are nearly identical to each other at 22 capture units (cu). Table 1 shows the capture cross section and decay time constants for various materials at a temperature of 300° K.

TABLE 1

| Material | $\Sigma$ (cu) | $\tau_d$ (µsec) |
|---|---|---|
| Quartz | 4.26 | 1,086 |
| Dolomite | 4.7 | 968 |
| Lime | 7.07 | 643 |
| 20 pu lime | 10.06 | 452 |
| Water | 22 | 206 |
| Salt Water (26% NaCl) | 125 | 36 |

The sigma of a formation is the weighted sum of the sigma of each of its components and any additional pore fluids. In a system where the chemical property of the formation is measured, equation (1) can be applied.

$$\sum = 10^3 \rho N_A \sum_{i=1}^{n} f_i \frac{\sigma_i}{A_i} \quad (1)$$

where
$\Sigma$=macroscopic capture cross section in cu
$f_i$=elemental weight fraction, i=1 ... n
$\sigma_i$=microscopic capture cross section in units of barns
$A_i$=atomic mass in units of gram/mole
$N_A$=Avogadro's number
$\rho$=formation density (g/cm$^3$)
barn=10$^{-24}$ cm$^2$
cu=a measurement of macroscopic capture cross section (1 capture unit=10$^{-3}$ cm$^{-1}$)

Equation (1) can be rearranged to obtain the formation density $\rho$ resulting in equation (2).

$$\rho = \frac{0.001 \cdot \sum}{N_A \sum_{i=1}^{n} f_i \frac{\sigma_i}{A_i}} \quad (2)$$

Figure 3:
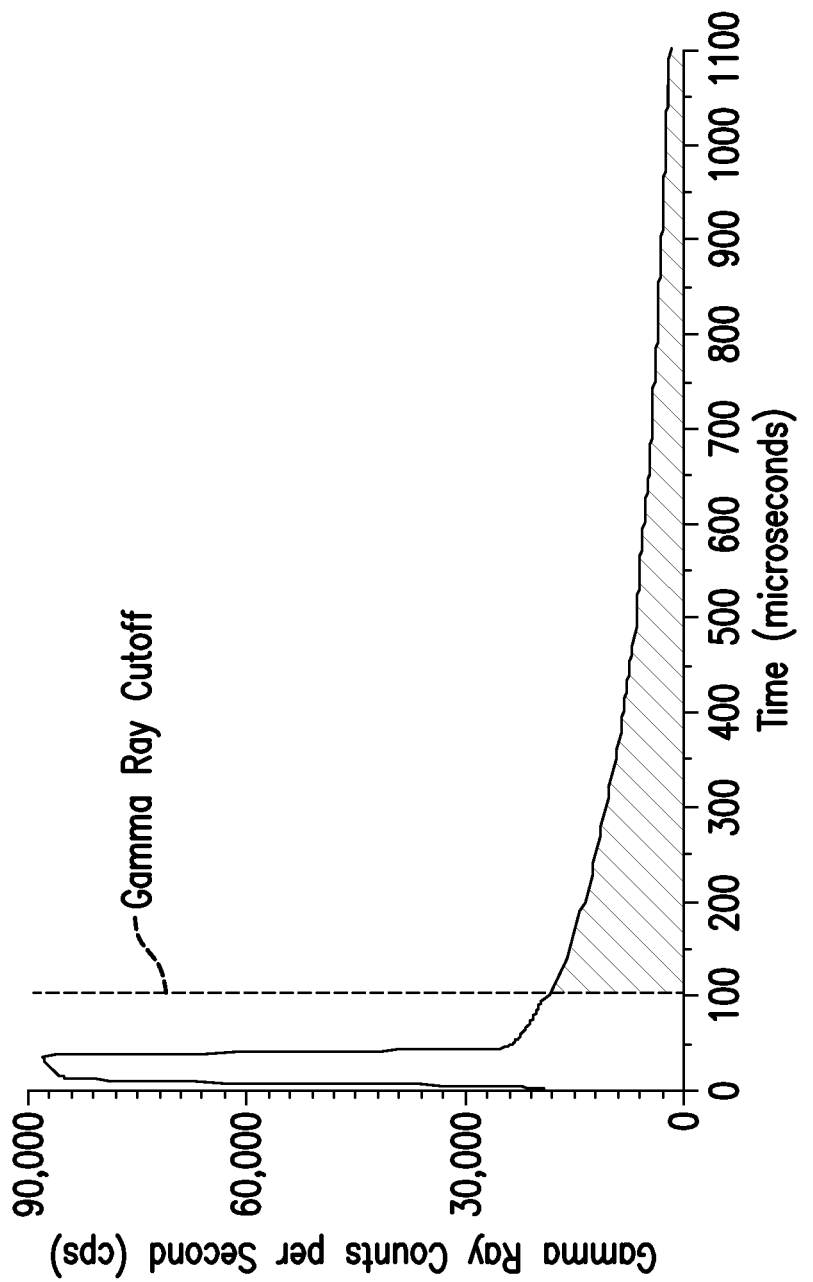
FIG. 3 depicts aspects of the timing cycle for measuring gamma-rays for Sigma measurement.

In equation (2), two key parameters: Σ and $f_i$ (weight fraction for element i) are obtained from measurements using the density logging tool 10. Sigma (Σ) is obtained by processing a time spectrum such as shown in FIG. 3, for example. Sigma units are in cu (capture unit). The shaded area in FIG. 3 after gamma-ray cutoff is used for sigma measurement. The weight fraction ($f_i$) is determined from deconvolution of the measured gamma-ray energy spectrum, following an energy spectral processing procedure. The gamma-ray energy spectrum is generally obtained in a time in interval that is within time interval or duration of the neutron pulse. Other parameters such as atomic mass A and microscopic capture cross section (in barns) are readily available in nuclear data cross section tables. Table 2 gives a list of the common earth elements and associated atomic number (Z), atomic mass (A), and microscopic capture cross section (in barns), and the elemental formation concentration (wt. fraction) for one example of a formation lithology.

| Element | Symbol | Z, Atomic Number | A, Atomic Mass (g/mole) | σ, Capture Cross Section (barns) | f, Elemental Formation Concentration (wt. fraction) |
|---|---|---|---|---|---|
| Aluminum | Al | 13 | 27.0 | 0.231 | 0.11 |
| Calcium | Ca | 20 | 40.1 | 0.429 | 0.09 |
| Chlorine | Cl | 17 | 35.5 | 33.0 | 0.001 |
| Gadolinium | Gd | 64 | 157.3 | 48765.0 | 3 ppm |
| Hydrogen | H | 1 | 1.0 | 0.333 | 0.003 |
| Iron | Fe | 26 | 55.8 | 2.56 | 0.02 |
| Magnesium | Mg | 12 | 24.3 | 0.063 | 0.36 |
| Potassium | K | 19 | 39.1 | 2.06 | 0.02 |
| Silicon | Si | 14 | 28.1 | 0.171 | 0.15 |
| Titanium | Ti | 22 | 47.9 | 6.1 | 0.007 |

Figure 4:
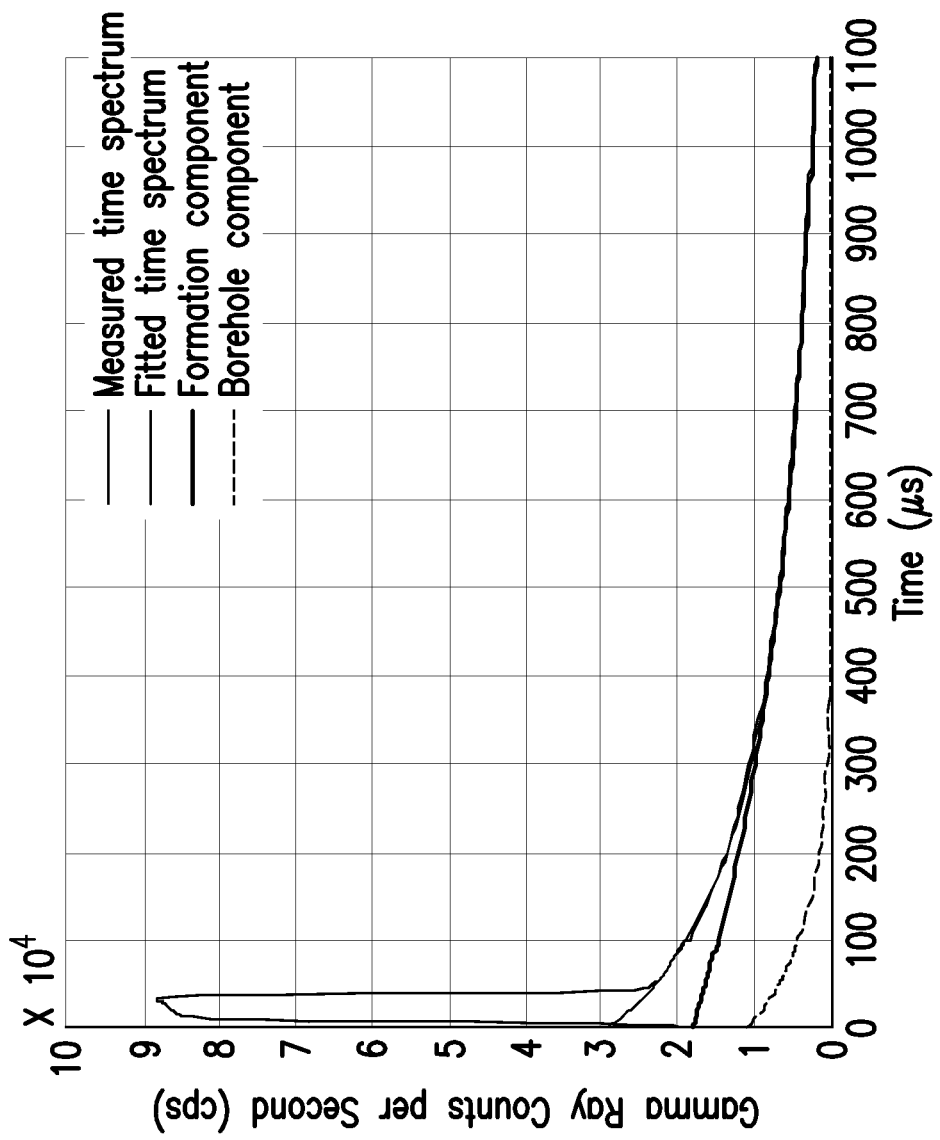
FIG. 4 depicts aspects of exponential decay for formation component spectrum and borehole component spectrum.

A description of a method to obtain sigma (Σ) is now presented. Apparent borehole and formation sigma can be determined from a dual-exponential decomposition of the time decay spectrum as shown in FIG. 4 for example. This method finds two exponential functions for which the sum represents the best fit to the dead-time (i.e., overlap between two consecutive neutron pulses) and background corrected time spectrum data. These exponential functions are represented in equation (3):

$$C_i = A_B e^{-(t_i-t_0)/\tau_B} + A_F e^{-(t_i-t_0)/\tau_F} \qquad (3)$$

where Ci is the gamma ray counting rate at time $t_i$, $\tau_B$ is the gamma ray decay time constant related to borehole sigma, while $\tau_F$ is related to formation sigma, and $t_0$ is the time at the start point of the curve to calculate sigma. Decay time constant (τ) can be converted to capture cross section (Σ) using the relation of equation (4) where Σ is in capture units (cu).

$$\sum = \frac{4550}{\tau} \qquad (4)$$

FIG. 4 shows the experimental time spectrum data measured in laboratory for Cordova cream formation block, where the tool 10 was put in 8.5-in. borehole filled with fresh water. The measured spectrum was regressed with two exponential decay functions corresponding to formation and borehole contributions, respectively. The summation of the fitted borehole and formation components agrees very well with the experimental data from 50 μs to 1100 μs. The double exponential curve regression method works very well when the gamma ray counting rates are in reasonably good statistical quality as demonstrated in FIG. 4, where the data were acquired in the laboratory formation rocks with adequate length of time. However, in certain situations depending on the logging rate it may not be suitable to calculate sigma for the tool in real-time logging, because the length of measurement time may be limited for each depth. Therefore, the time spectrum for sigma measurement may have low statistical precision inherent in gamma-ray counting rate, and the curve fitting method may not yield reliable and robust result in these situations.

In general, thermal neutrons in the borehole are captured early. Thus, using an appropriate preset time cut-off, when much of the borehole decay counts have been absorbed already, leaves a signal dominated by formation sigma. Then the borehole component in equation (3) approaches zero (i.e., negligible, less than 1% of formation count rate) and the time-dependent gamma-ray capture counts can be reduced to a function of only formation sigma at any given time t, as shown in equation (5) where $\Sigma_F$ is the formation sigma, C(t) is the number of gamma rays counted at any time t in μsec, $C_0$ is the number of gamma-rays counted at $t_0$ and $t_0$ is the preset time cut-off. It is worthwhile to point out that an environmental correction algorithm may also be needed to further eliminate borehole effects if the preset time cut-off cannot reduce borehole signal to negligible amount for a large borehole size.

$$C(t) = C_0 \cdot \exp\left[\frac{-\sum_F \cdot (t - t_0)}{4500}\right] \qquad (5)$$

By setting T=t−$t_0$, equation (5) can be rewritten as equation (6).

$$C(T) = C_0 \cdot \exp\left(\frac{-\sum_F \cdot T}{4500}\right) \qquad (6)$$

Normally, $\Sigma_F$ in equation (6) is solved by exponential curve fitting when the C(T) has a high counting rate. For a low count rate problem, $\Sigma_F$ can be determined from the integral of C(T) with respect to T within a fixed time interval (from 0 μs to 1,000 μs for demonstration simplicity) as shown in equation (7) where S is the sum of the counts in the specified time window.

$$S = \int_0^{1000} C(T) \, dT = \frac{4550 \cdot C_0}{\Sigma_F} \cdot \left[1 - \exp\left(\frac{-\sum_F}{4.550}\right)\right] \qquad (7)$$

Equation (7) can be arranged as to give equation (8).

$$\frac{1}{\Sigma_F} \cdot \left[1 - \exp\left(\frac{-\sum_F}{4.550}\right)\right] = \frac{S}{4550 \cdot C_0} \qquad (8)$$

$\Sigma_F$ in equation (7) can be solved with numerical methods. A semi-empirical correlation model for non-linear regression between $\Sigma_F$ and S/$C_0$ is given in equation (9) where the parameters—a, b, and c—are optimized from non-linear regression with laboratory measured time spectrum data.

$$\Sigma_F = a + b \cdot \left(\frac{S}{C_0}\right)^c \quad (9)$$

It can be appreciated that equation (9) is just one example of an equation form of the semi-empirical correlation model and that other equation forms can also be used.

In general, S and $C_0$ must be corrected for background noise (B), which is usually measured as the summation of counts in a background counts time window at a later time in the time spectrum. Background counting does not have to be performed in one or more embodiments for every set of measurements related to a neutron pulse, but enough times to obtain an accurate background count. To overcome the statistical uncertainty of the single count of $C_0$, $C_0^W$ is used instead as the summation of the gamma ray counts in a specified time window closer to $t_0$. Therefore, the sigma characteristic parameter, Counts Window Ratio ($C_{WR}$), is defined as in equation (10) where $B_S$ are the background counts corresponding to the time window for S and $B_0^W$ are background counts corresponding to the time window for $C_0^W$.

$$C_{WR} = \frac{S - B_S}{C_0^W - B_0^W} \quad (10)$$

All parameters (S, $C_0^W$, $B_S$, and $B_0^W$) are available from the measured time spectrum. Consequently, $C_{WR}$ can be calculated from the gamma ray time spectrum. Hence, $\Sigma_F$ can be determined from equation (11) where a, b and c are obtained from regression.

$$\Sigma_F = a + b \cdot C_{WR}^c \quad (11)$$

Figure 5:
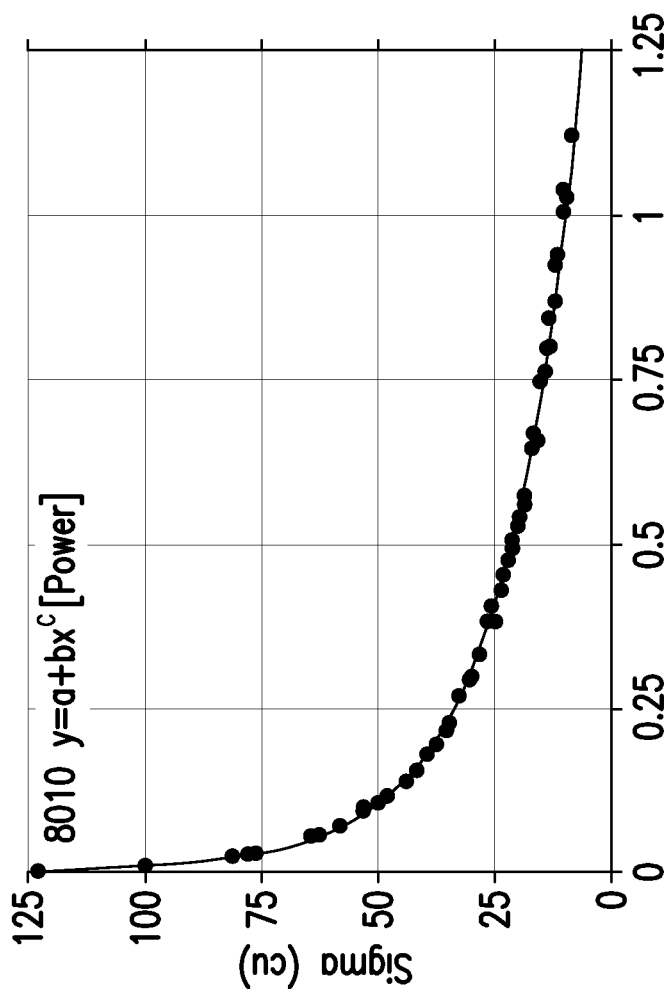
FIG. 5 depicts aspects of a correlation between Sigma and Counts Window Ratio.

FIG. 5 shows a strong correlation between formation sigma ($\Sigma$) and $C_{WR}$. Hence, equation (11) and regressed parameters—a=−185, b=195 and c=−0.084—can be used to calculate formation sigma ($\Sigma$).

Figure 6:
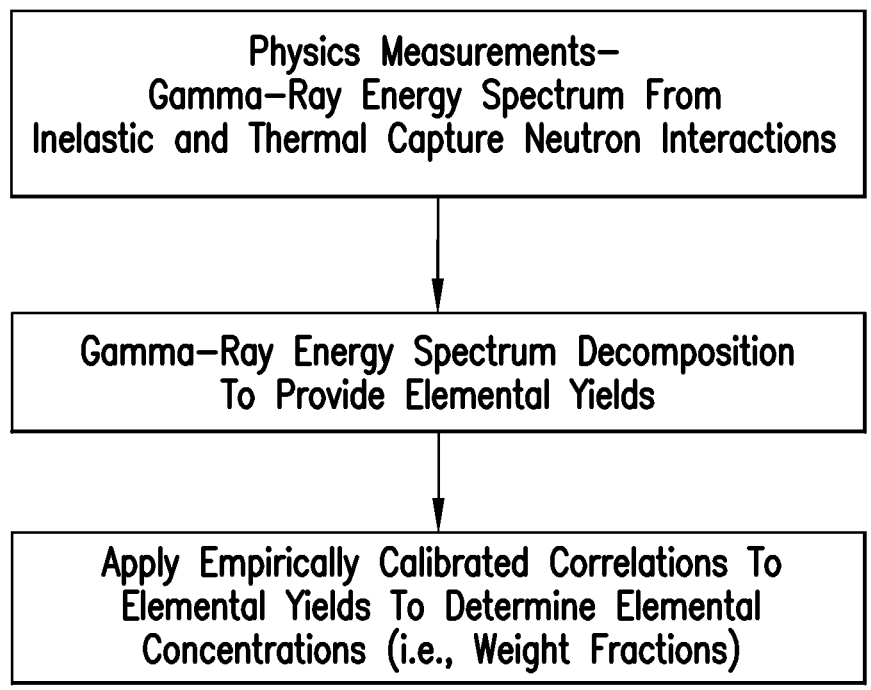
FIG. 6 presents one example of a flow chart for obtaining formation elemental weight fractions.

A description of a method to obtain elemental weight fraction ($f_i$) is now presented. Pulsed neutrons are used to provide the measurements of macroscopic thermal neutron capture cross section and measurements of formation elemental concentrations. For the formation elemental concentration measurements, the neutron-induced gamma rays, either from neutron inelastic scattering interaction or from thermal neutron capture interaction, are detected by using gamma-ray detectors. Output from the gamma-ray detectors is used to generate a photon energy spectrum. With the techniques of spectrum decomposition, the component of each formation element out of the total energy spectrum can be separated. A series of calibrations are pre-determined by either laboratory measurements or numerical modeling. The calibrations are used to convert the separated elemental yield to elemental concentration or weight fraction. A flow chart for determining elemental concentrations by using a pulsed-neutron source is illustrated in FIG. 6.

Figure 7:
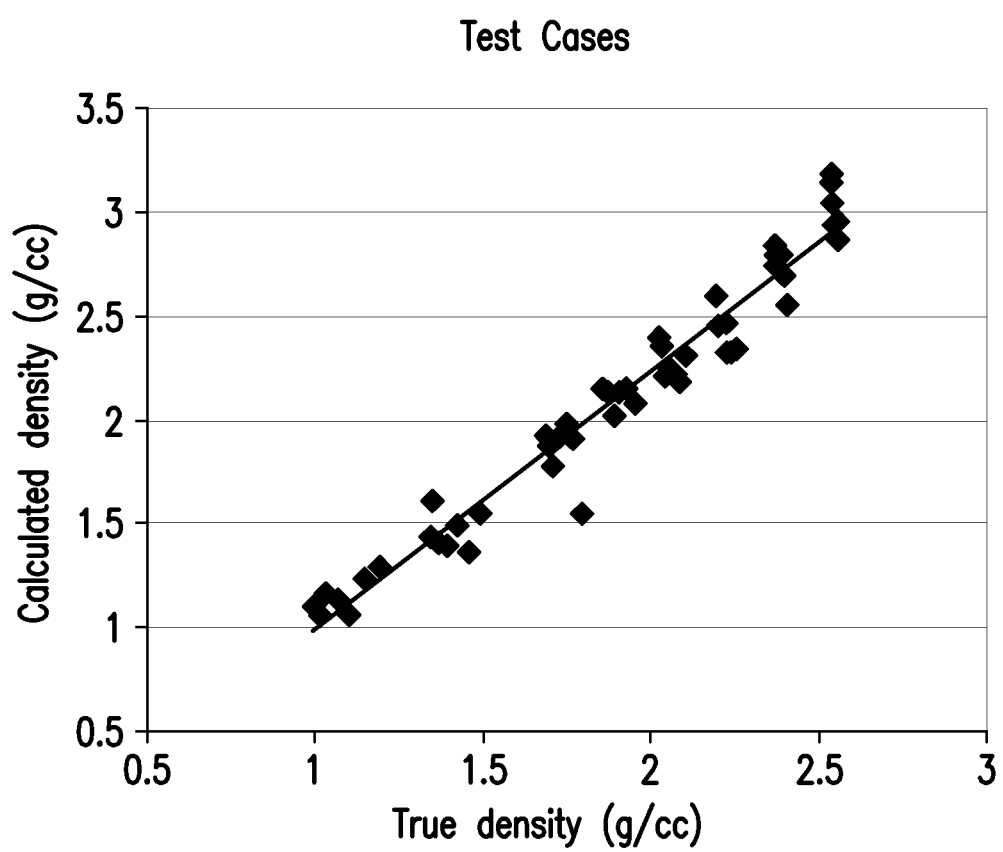
FIG. 7 depicts aspects of a cross-plot of calculated density versus true density for test cases.

The methods disclosed herein were tested using Monte Carlo computer models. The density logging tool 10 was simulated in an 8.5-in borehole surrounded with Limestone formation blocks with porosities: 0 pu, 10 pu, 20 pu, 30 pu, 40 pu, 50 pu, and 100 pu in a water tank filled by fresh water and then saline water (25 kppm, 50 kppm, 100 kppm, 150 kppm, 200 kppm, and 250 kppm NaCl). The true density of the formation block can be directly calculated because its constituents are known. Monte Carlo simulations were used to generate a time-spectrum for each formation block. From the time spectra, sigmas were calculated by applying the algorithm to calculate sigma as stated previously. Using the calculated sigmas and applying equation (2), the densities of the formation block were calculated and compared with the true densities. FIG. 7 shows the cross plot between calculated density and true density for each formation block and it is demonstrated that the calculated densities agree with the true values. It proves that this disclosure works for densities ranging at least from 1 to 3 g/cc.

Figure 8:
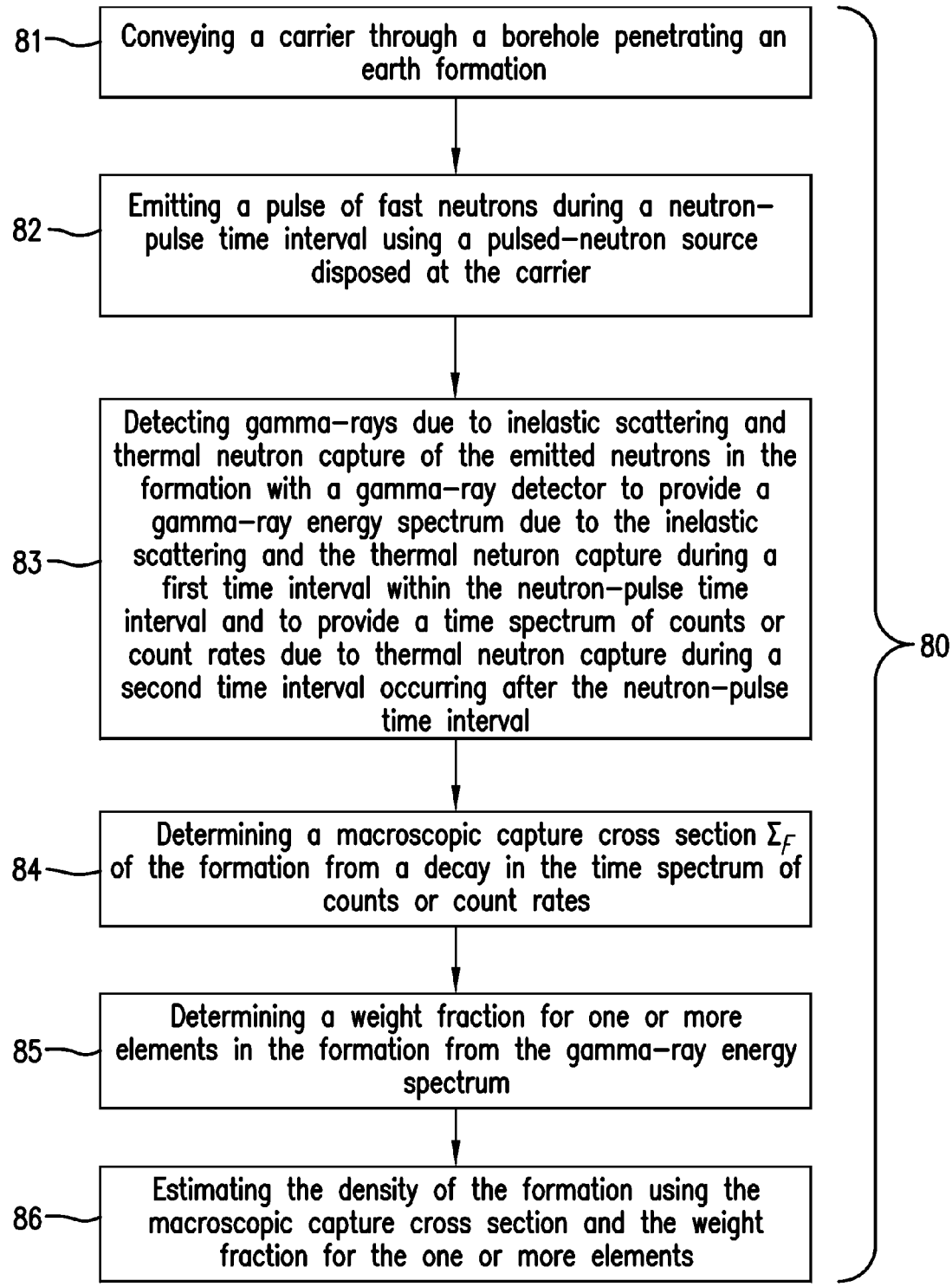
FIG. 8 presents one example of a method for estimating a density of an earth formation penetrated by a borehole.

FIG. 8 presents one example of a method 80 for estimating density of an earth formation penetrated by a borehole. The method 80 calls for (step 81) conveying a carrier through the borehole. Further, the method 80 calls for (step 82) emitting a pulse of fast neutrons during a neutron-pulse time interval using a pulsed-neutron source disposed at the carrier. Further, the method 80 calls for (step 83) detecting gamma-rays due to inelastic scattering and thermal neutron capture of the emitted neutrons in the formation with a gamma-ray detector to provide a gamma-ray energy spectrum due to the inelastic scattering and the thermal neutron capture during a first time interval within the neutron-pulse time interval and to provide a time spectrum of counts or count rates due to thermal neutron capture during a second time interval occurring after the neutron-pulse time interval. Further, the method 80 calls for (step 84) determining a macroscopic capture cross section $\Sigma_F$ of the formation from a decay in the time spectrum of counts or count rates. Further, the method 80 calls for (step 85) determining a weight fraction for one or more elements in the formation from the gamma-ray energy spectrum. Further, the method 80 calls for (step 86) estimating the density of the formation using the macroscopic capture cross section and the weight fraction for each of the one or more elements.

In support of the teachings herein, various analysis components may be used, including a digital and/or an analog system. For example, the downhole electronics 11, the surface computer processing 12, the pulsed-neutron source 7, or the gamma-ray detectors 8 and 9 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of non-transitory computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a density of an earth formation penetrated by a borehole, the method comprising:
   conveying a carrier through the borehole;
   emitting a pulse of fast neutrons into the formation during a neutron-pulse time interval using a pulsed-neutron source disposed at the carrier;
   detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval;
   determining a macroscopic capture cross section $\Sigma_F$ of the formation from a decay in the time spectrum of counts or count rates;
   determining a weight fraction for one or more elements in the formation from the gamma-ray energy spectrum and
   estimating the density of the formation using the macroscopic capture cross section and the weight fraction for the one or more elements;
   wherein the second time interval begins after a cut-off time $t_0$ beyond which contribution to count rate due to borehole elements is negligible with respect to count rate due to formation elements.

2. The method according to claim 1, wherein the macroscopic cross section $\Sigma_F$ is determined by solving the following equation where C(t) is the total number of gamma-ray counts detected at time t, $C_0$ is a number of gamma-ray counts in a count window at $t_0$:

$$C(t) = C_0 \cdot \exp\left[\frac{-\sum_F \cdot (t - t_0)}{4500}\right].$$

3. The method according to claim 1, wherein the macroscopic cross section $\Sigma_F$ is determined by solving the following equations where C(t) is the total number of gamma-ray counts detected at time t, $C_0$ is a number of gamma-ray counts in a first count window at $t_0$, $T=t-t_0$, $t_1$ to $t_2$ is a time interval for integrating C(t) with respect to dT, $C_{WR}$ is the Count Window Ratio, $C_0^W$ is a summation of counts in a second count window at $t_0$ that is wider than the first count window, BS represents background counts corresponding to time interval $t_1$ to $t_2$, $B_0^W$ represents background counts corresponding to the time window for $C_0^W$, and a, b and c are constants:

$$\sum_F = a + b \cdot C_{WR}^c$$

$$C_{WR} = \frac{S - B_S}{C_0^W - B_0^W}$$

$$S = \int_{t_1}^{t_2} C(T) dT = \frac{4550 \cdot C_0}{\Sigma_F} \cdot \left[1 - \exp\left(\frac{-\sum_F}{4.550}\right)\right].$$

4. The method according to claim 3, further comprising using regression analysis to determine a, b and c.

5. A method for estimating a density of an earth formation penetrated by a borehole, the method comprising:
   conveying a carrier through the borehole;
   emitting a pulse of fast neutrons into the formation during a neutron-pulse time interval using a pulsed-neutron source disposed at the carrier;
   detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval;
   determining a macroscopic capture cross section $\Sigma_F$ of the formation from a decay in the time spectrum of counts or count rates;
   determining a weight fraction for one or more elements in the formation from the gamma-ray energy spectrum;
   estimating the density of the formation using the macroscopic capture cross section and the weight fraction for the one or more elements;
   decomposing the gamma-ray energy spectrum to a yield of each element contributing to the gamma-ray energy spectrum; and
   determining a weight fraction for each elemental yield using calibration data for a configuration of the pulsed-neutron source and the gamma-ray detector used to obtain the gamma-ray energy spectrum.

6. A method for estimating a density of an earth formation penetrated by a borehole, the method comprising:
  conveying a carrier through the borehole;
  emitting a pulse of fast neutrons into the formation during a neutron-pulse time interval using a pulsed-neutron source disposed at the carrier;
  detecting gamma-rays due to inelastic scattering and thermal capture of the emitted neutrons in the formation with a gamma-ray detector to provide a gamma-ray energy spectrum due to the inelastic scattering and the thermal capture during a first time interval within the neutron-pulse time interval and to provide a time spectrum of counts or count rates due to thermal capture during a second time interval occurring after the neutron-pulse time interval;
  determining a macroscopic capture cross section $\Sigma_F$ of the formation from a decay in the time spectrum of counts or count rates;
  determining a weight fraction for one or more elements in the formation from the gamma-ray energy spectrum and estimating the density of the formation using the macroscopic capture cross section and the weight fraction for the one or more elements;

wherein estimating the density of the formation comprises solving the following equation where $f_i$ is the weight fraction of the i-th element, $\sigma_i$ is the microscopic cross section of the i-th element in barns, $A_i$ is the atomic mass of the i-th element in grams/mole, $N_A$ is Avogadro's number, $\Sigma_F$ is in cu, and $\rho$ is in grams/cm$^3$:

$$\rho = \frac{0.001 \cdot \Sigma_F}{N_A \sum_{i=1}^{n} f_i \frac{\sigma_i}{A_i}}.$$

* * * * *